US009272398B2

(12) United States Patent
Keller et al.

(10) Patent No.: US 9,272,398 B2
(45) Date of Patent: Mar. 1, 2016

(54) HAND MACHINE TOOL

(75) Inventors: Valentin Keller, Augsburg (DE); Manfred Ludwig, Landsberg (DE); Konstantin Baxivanelis, Kaufering (DE); Michael Weber, Eichenau (DE); Bastian Roll, Landsberg am Lech (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 683 days.

(21) Appl. No.: 13/584,237

(22) Filed: Aug. 13, 2012

(65) Prior Publication Data

US 2013/0048460 A1 Feb. 28, 2013

(30) Foreign Application Priority Data

Aug. 11, 2011 (DE) ......................... 10 2011 080 800

(51) Int. Cl.
*B23Q 5/00* (2006.01)
*B25B 21/00* (2006.01)
*B25B 23/14* (2006.01)

(52) U.S. Cl.
CPC ............... *B25B 21/00* (2013.01); *B25B 23/141* (2013.01)

(58) Field of Classification Search
CPC .............................. B25B 21/00; B25B 23/141
USPC .............................. 173/176, 1, 5, 7, 179, 180
See application file for complete search history.

(56) References Cited

U.S. PATENT DOCUMENTS 3,563,353 A * 2/1971 LoPresti et al. ................. 192/21
3,834,252 A 9/1974 Abell et al.
3,874,460 A * 4/1975 Schmid et al. ................ 173/109
3,880,267 A 4/1975 Auble et al.
3,942,337 A * 3/1976 Leonard ................ B25B 23/141 464/36
3,986,634 A * 10/1976 Smith et al. .................... 220/288
4,162,000 A * 7/1979 Zlotek .......................... 192/41 A
4,272,973 A * 6/1981 Fu-Tsai ................. B25B 23/141 464/23
4,285,422 A * 8/1981 Bentley ...................... 192/105 B
4,901,610 A * 2/1990 Larson ................ B25B 23/1427 81/473
5,005,682 A * 4/1991 Young et al. ..................... 192/34
5,366,412 A * 11/1994 Beaty ......................... F16D 7/08 433/173
5,373,905 A * 12/1994 Bleicher et al. ............... 173/109
5,505,676 A * 4/1996 Bookshar ...................... 477/178
5,954,140 A * 9/1999 Bauer ............................. 173/48

(Continued)

FOREIGN PATENT DOCUMENTS

CH 583088 A5 12/1976
DE 2402218 A 8/1974
DE 8121773.0 U1 11/1981

OTHER PUBLICATIONS

DE Communication, May 7, 2012, 5 pages.

*Primary Examiner* — Robert Long
(74) *Attorney, Agent, or Firm* — McAndrews, Held & Malloy, Ltd.

(57) ABSTRACT

A hand machine tool includes a tool retainer that retains a tool, a motor that drives the tool retainer in a rotary motion, and a torque-controlled sliding clutch that is connected in a drivetrain between the motor and the tool retainer. The sliding clutch includes a first clutch disk, a second clutch disk, a spring and a controlling unit which can be activated manually. The second clutch disk is arranged displaceably alongside an axis limited by a stop in the direction toward the first clutch disk. Force is applied to the second clutch disk by the spring alongside the axis in the direction toward the first clutch disk. The manually activated controlling unit variably sets an axial distance between the first clutch disk and the stop, with which an engagement depth of the first clutch disk with the second clutch disk can be defined.

18 Claims, 3 Drawing Sheets

(56) References Cited

U.S. PATENT DOCUMENTS

| | | | | |
|---|---|---|---|---|
| 6,312,339 | B1 * | 11/2001 | Beyert | F16D 7/08 192/56.62 |
| 6,339,977 | B1 * | 1/2002 | Lee | B25B 13/466 192/43 |
| 7,032,476 | B2 * | 4/2006 | Lin | B25B 15/001 81/473 |
| 8,104,383 | B2 * | 1/2012 | Lai | B25B 13/06 84/475 |
| 8,459,658 | B2 * | 6/2013 | Cycon | 279/19.6 |
| 8,528,658 | B2 * | 9/2013 | Roehm et al. | 173/47 |
| 2006/0076154 | A1 * | 4/2006 | Aoki | 173/212 |
| 2007/0149293 | A1 * | 6/2007 | Veit et al. | 464/39 |
| 2007/0289759 | A1 * | 12/2007 | Hartmann et al. | 173/48 |
| 2010/0078289 | A1 * | 4/2010 | Gokan et al. | 192/93 B |
| 2010/0267512 | A1 * | 10/2010 | Curtis | 475/231 |
| 2010/0304916 | A1 * | 12/2010 | Curtis | 475/231 |
| 2010/0326687 | A1 * | 12/2010 | Roehm et al. | 173/48 |
| 2011/0127059 | A1 * | 6/2011 | Limberg et al. | 173/216 |

* cited by examiner

HAND MACHINE TOOL

CROSS-REFERENCE TO RELATED APPLICATIONS

The present application claims priority to German Patent Application No. DE 10 2011 080 800.0, filed Aug. 11, 2011, which is hereby incorporated by reference herein in its entirety.

FIELD OF THE INVENTION

Some embodiments of the present invention relate to a hand machine tool and, in particular, to an electric screw driver.

BRIEF SUMMARY OF THE INVENTION

The hand machine tool according to some embodiments includes a tool retainer that retains a tool, a motor that drives the tool retainer in a rotary motion, and a torque-controlled sliding clutch that is connected in a drivetrain between the motor and the tool retainer. The sliding clutch includes a first clutch disk, a second clutch disk, a spring, and a controlling unit which can be activated manually. The second clutch disk is displaceably arranged alongside an axis limited by a stop in a direction toward the first clutch disk. Force is applied to the second clutch disk by the spring alongside the axis in the direction toward the first clutch disk. The manually activated controlling unit variably sets an axial distance between the first clutch disk and the stop, with which an engagement depth of the first clutch disk with the second clutch disk can be defined.

In some embodiments, the spring keeps the two clutch disks engaged by default. The stop maintains a distance between the second clutch disk and the first clutch disk. Consequently, the engagement depth of the second clutch disk with the first clutch disk is limited by the stop. If a torque applied to the sliding clutch exceeds a critical limit, the second clutch disk is deflected alongside the axis against the effect of the spring to the point where the two clutch disks are fully disengaged and the torque transmission is interrupted. The limiting value can be set with the engagement depth, which is defined by the relative position of the first clutch disk compared to the stop. As a result, the controlling unit enables the user to set a desired triggering torque.

According to one embodiment, the first clutch disk has cams and the second clutch disk has cams. The clutch disks are engaged with each other via the cams. Each of the cams of at least one of the two clutch disks has a convexly curved top, wherein the radius of curvature of the top increases toward the summit. The cam has a concave base starting from a bottom, for example, having a negative curvature. In some embodiments, a flat side is connected to the base, followed by the convex top with the positive curvature. Alternatively, the convex top can be connected directly to the concave base. The sequence of the structures of a cam is viewed along a circumferential direction and at a constant distance to the axis. The top describes the entire area of a cam with a convex shape. The curvature of the top decreases from the base toward the direction of the summit or peak of the top. Although the grooves can be disadvantageous for other models of a sliding clutch due to their larger widths, they have proven advantageous in the presented configurations according to some embodiments. The decreasing curvature enables a robust setting of a low engagement depth and hence a low limit for triggering the sliding clutch. The mechanism is in particular robust against tolerances associated with the manufacture and installation of the sliding clutch. Setting high limits with a deep engagement depth is equally possible in some embodiments.

Some embodiments provide that the top includes of a first section and a second section on an ascending side to the summit and the first section includes a first radius of curvature and the second section includes a second radius of curvature in which the first radius of curvature is lower than the second radius of curvature. In some embodiments, the top is designed with two different radii of curvature (e.g., exactly two different radii of curvature). On the descending side, the radius of curvature can decrease again from the larger second radius of curvature to the first radius of curvature. The first radius of curvature is, for example, lower by at least 20% than the second radius of curvature. The second radius of curvature can be between 0.9 and 1.2 times as high as a height of the cam. The height of the cam refers to the maximum dimension of the cam alongside the axis, for example, from the start of the base to the summit of the top.

According to some embodiments, the second clutch disk is arranged movably on a shaft (e.g., an intermediate shaft), and the first clutch disk and the second clutch disk are arranged movably alongside the axis relative to the shaft.

The first clutch disk rests on an additional stop formed by the controlling mechanism displaceable alongside the axis toward a direction facing away from the second clutch disk. The two clutch disks are limited in their axial motion in the same direction by two separate stops. The other stop is displaceable relative to the first stop and the distance between them defines the engagement depth of the two clutch disks.

According to some embodiments, the second clutch disk is interlocked with the shaft for transmitting a torque and the first clutch disk is interlocked with an additional shaft for transmitting a torque in which the first clutch disk is displaceable relative to an additional shaft. The additional shaft is, for example, a spindle which retains a tool or is connected with the tool retainer. An axial mobility of the first clutch disk relative to the other shaft can, for example, be achieved with an interconnected claw clutch.

DETAILED DESCRIPTION OF THE INVENTION

Figure 1:
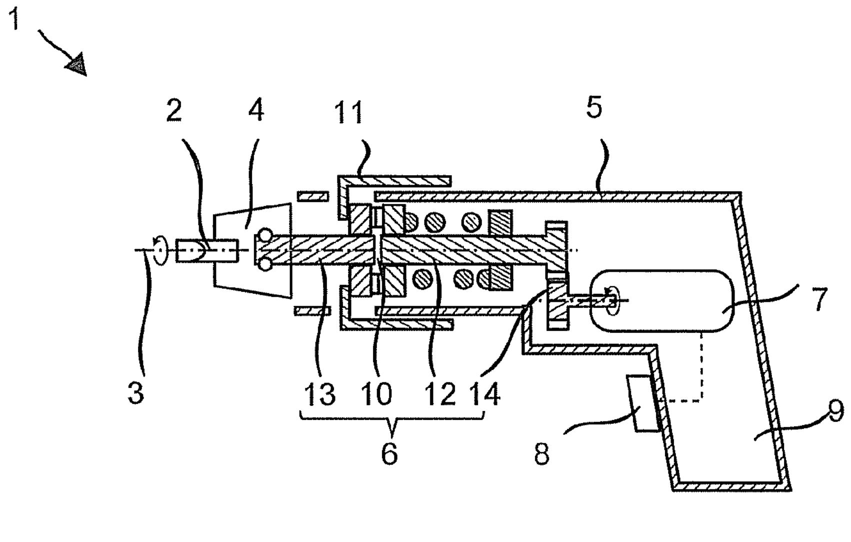
FIG. 1 shows an electric screw driver.

FIG. 1 illustrates an exemplary electric screw driver 1 which drives a tool 2, or example, a screw bit, around a working axis 3 in a rotary motion when in operation. A tool retainer 4 for a tool 2 is arranged on a case 5 and is pivotal around the working axis 3. The tool retainer 4 is coupled with an electric motor 7 via a drivetrain 6. The electric motor rotates in response to the operation of a system button 8. A user can start the electric screw driver 1 by means of the system button 8 and guide it by means of a handle 9 provided on the case 5.

Figure 2:
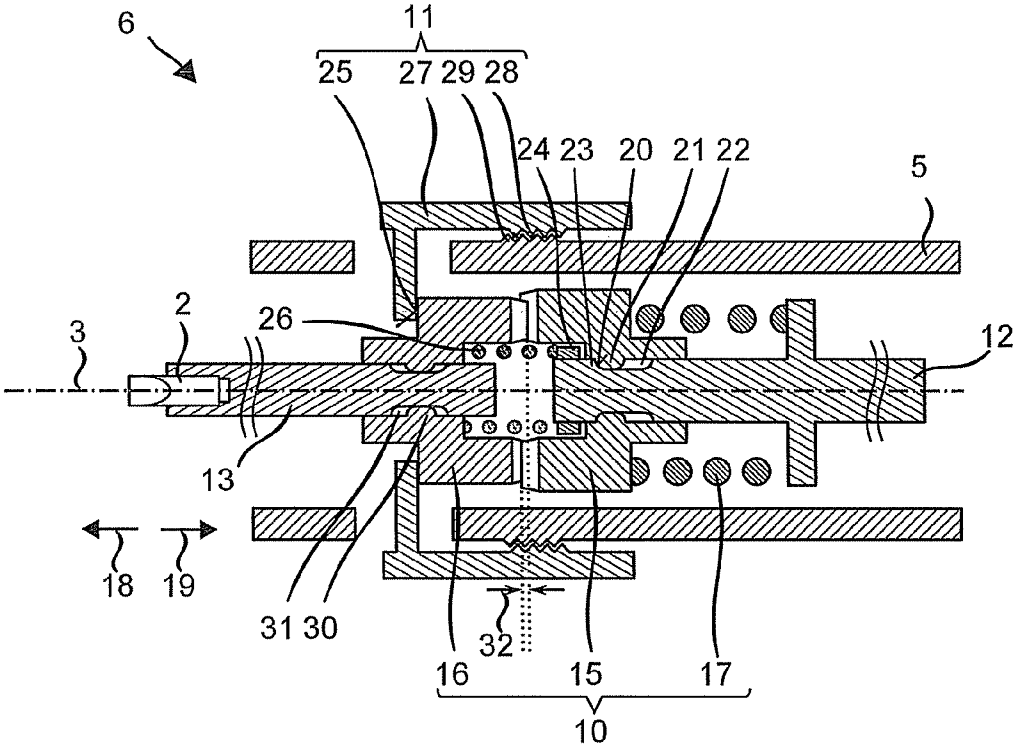
FIG. 2 shows a drivetrain of the electric screw driver.

FIG. 2 illustrates a design of the drivetrain 6 with an adjustable sliding clutch 10, which interrupts a transmission of a torque if an applied torque exceeds a limiting value. The limiting values can be set by a user by means of a slide 11. The sliding clutch 10 engages with a countershaft 12 on the side of the drivetrain and with an output spindle 13 on the output side, which are both coaxial to the working axis 3. The countershaft 12 is arranged axially stationary in the case 5. The countershaft 12 is, for example, driven with a transmission 14, here illustrated with two pinions as an example, which is connected torque-resistant with the electric motor 7. The output spindle 13 is provided with the tool retainer 4 on a frontal end. The illustrated design of the drivetrain 6 is exemplary and may contain additional transducing or power-interrupting components in other embodiments.

The slide clutch 10 includes a clutch disk 15 on the drive side, a clutch disk 16 on the output side and a pull-back spring 17. The clutch disk 15 on the drive side is arranged axially moveable on the countershaft 12. The clutch disk 15 on the drive side can approach the clutch disk 16 on the output side alongside the working axis 3 in the engagement direction 18 or distance itself from the clutch disk 16 on the output side in the release direction 19 (e.g., in the opposite direction of the engagement direction 18). The pull-back spring 17 acts on the clutch disk 15 on the drive side in the engagement direction 18, pushing it toward the clutch disk 16 on the output side in the engagement direction 18. In a basic position of the slide clutch 10, for example, without applied torque, the clutch disk 15 on the drive side is as close to the clutch disk 16 on the output side as possible. In the basic position, the clutch disks 15, 16—designed, for example, in the form of cam rings—are engaged, whereby the clutch disk 15 on the drive side transmits an applied torque to the clutch disk 16 on the output side. One shape of the cam rings is designed in such a way that a force acting in the release direction 19 is exerted onto the clutch disk 15 on the drive side if a torque is applied. If the applied torque exceeds the limiting value, then the force is sufficiently released at the clutch disk 15 on the drive side against the force of the pull-back spring 17 in the release direction 19 to the point where the cam rings are completely disengaged.

A first stop 20 limits a movement of the clutch disk 15 on the drive side toward the engagement direction 18 in that the clutch disk 15 on the drive side comes to rest on this first stop 20 in the engagement direction 18. The first stop 20 is arranged alongside an axial line between the clutch disk 15 on the drive side and the clutch disk 16 on the output side. The first stop 20 is axially stationary relative to the case 5 and the countershaft 12. Consequently, the first stop 20 determines the relative axial position of the clutch disk 15 on the drive side compared to the clutch disk 16 on the output side in the basic position. In FIG. 2, the clutch disk 15 on the drive side has at least one radially protruding peg 21, which engages with an axially running longitudinal groove 22 in the countershaft 12. The longitudinal groove 22 is closed on one end of the groove 23 in the engagement direction 18. The end of the groove 23 forms the first stop 20 and the peg 21 forms an interlock for the torsionally rigid coupling of the clutch disk 15 on the drive side with the countershaft 12 for the transmission of a torque. The interlock can include a plurality of longitudinal grooves 22 and pegs 21. The first stop 20 can alternatively or additionally be formed with a ring 24 placed onto the countershaft 12. The ring 24 is placed onto an end of the countershaft 12 pointing into the engagement direction 18.

The clutch disk 16 on the output side is arranged movable relative to the countershaft 12. Referring to FIG. 2, the clutch disk 16 on the output side is axially arranged movably on the output spindle 13. A second stop 25 limits the motion of the clutch disk 16 on the output side in the engagement direction 18. The directions are always quoted with respect to the motion of the clutch disk 15 on the drive side. If a torque is applied, the clutch disk 16 on the output side touches the second stop 25. The shape of the grooves results in a partial conversion of the torque into a force acting on the clutch disk 16 on the output side in the engagement direction 18. An optional spring 26 can be provided to retain the clutch disk 16 on the output side on the second stop 25. The spring 26 acts on the clutch disk 16 on the output side in the engagement direction 18 and is braced, for example, on the countershaft 12.

The second stop 25 is connected with the slide 11. The slide 11 has a runner 27 which is, for example, placed onto the case 5 and can be rotated relative to the case 5. The runner is provided for the user to grasp. A thread 28 on the runner 27 oriented alongside the working axis 3 engages with a corresponding thread 29 of the case 5. When the runner 27 is turned, the runner 27 is displaced relative to the case 29 and the countershaft 12 alongside the working axis 3. The second stop 25 is a ring protruding inward formed on the runner 27.

The clutch disk 16 on the drive side has, for example, one or a plurality of pegs 30 pointing inward, which engage with grooves 31 in the output spindle 13 for transmitting a torque.

The first stop 20 and the second stop 25 define an axial distance between the clutch disk 15 on the drive side and the clutch disk 16 on the output side and hence a depth 32 of engagement in the basic position. Starting from the basic position, the engagement depth 32 corresponds to the deflection of the clutch disk 15 on the drive side in the release direction 19 which releases the sliding clutch 10. The torque used to release the sliding clutch 10 increases with increasing engagement depth 32, amongst other things, because of the spring power of the pull-back spring 17 increasing progressively as a result of the deflection. The user can set the limiting value for the transmitted torque by axially displacing the second stop 25.

Figure 3:
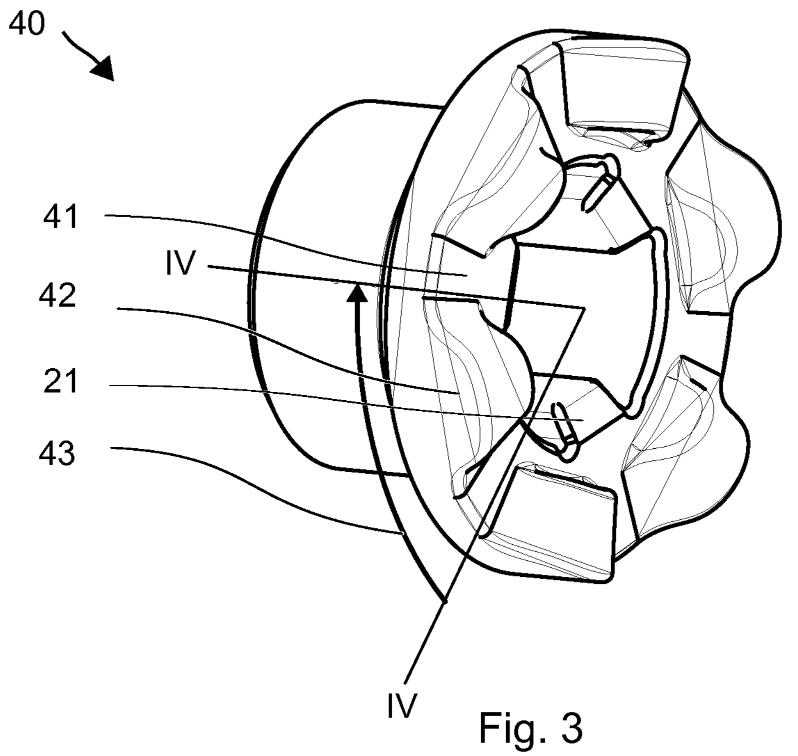
FIG. 3 shows a clutch disk.
Figure 4:
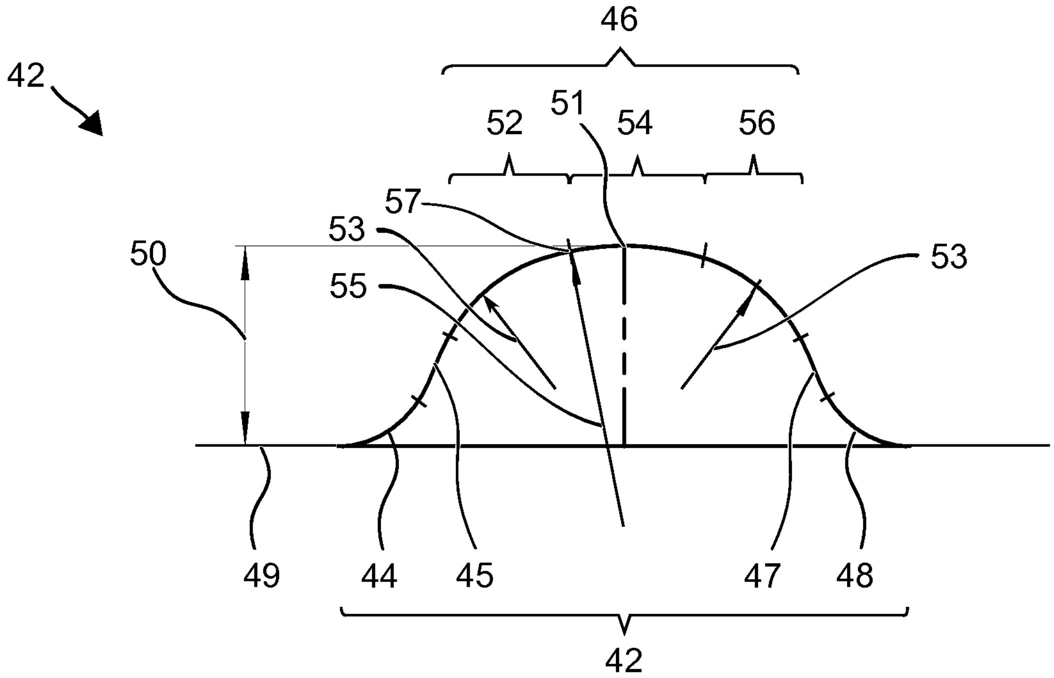
FIG. 4 shows a clutch disk.

FIG. 3 shows an exemplary clutch disk 40 on the drive side in a perspective representation, with a view of a frontal area 41 pointing toward the engagement direction 19. FIG. 4 shows a section of an unrolled profile of the clutch disk 40 in which the cut out section is indicated as cylindrical area IV-IV in FIG. 3. The clutch disk 40 has a plurality of cams 42 (e.g., uniform cams) on the frontal area 41. A clutch disk on the output side can be provided with identical cams as those of the clutch disk 40 on the drive side. The cams 42 are arranged successively in the circumferential direction 43 around the working axis 3. Arranged successively in the circumferential direction 43, the cam 42 has a front base 44, a flank 45 rising in the engagement direction 19, a top 46, a flank 47 sloping down in the engagement direction 19 and a back base 48. The clutch disk 40 can include a flat bottom 49 between two successive cams 42.

During an engagement of the clutch disk 40 on the drive side with the clutch disk on the output side, the respective rising flanks 45 extensively rest on each other. The rising flank 45 and the falling flank 47 are flat for this purpose according to some embodiments. An incline of the flanks 45, 47 relative to the working axis 3 ranges, for example, between 45 degrees and 70 degrees. The incline defines the conversion of the applied torque into an axially acting force. The flank 45 covers a ratio of 20% to 30% of a height 50 of the cam 42. The slide 11 makes it possible to define the engagement depth 32. If the engagement depth 32 is deeper, the rising flanks 45 of the two clutch disks are completely resting on each other across the entire height.

In some embodiments, the base 44 has a negative curvature with a constant radius of curvature from the bottom 49 to the flank 45. A transition from the bottom 49 to the base 44 is smooth, i.e., provided with a gradually rising incline without any jumps. Similarly, a transition between the base 44 and the flank 45 is smooth. In some embodiments, a radius of curvature of the base 44 is considerably smaller than the height 50 of the cam 42, e.g., smaller than 40% of the height 50. The ratio of the base 44 on the height 50 of the cam 42 can therefore be kept low.

The top 46 has a continuous positive curvature, which includes at least two radii of curvature in the rise from the rising flank 45 to a summit 51 of the top 46. The flank 45 transitions smoothly into a first section 52 of the top 46. The first section 52 has a first radius of curvature 53 and transitions smoothly into a second section 54 with a second radius of curvature 55. The summit 51 of the top 46 is located in the second section 54. The exemplary top 46 is symmetrical to the summit 51, and a third section 56 with a radius of curvature identical to the first radius of curvature 53 is connected to the second section 54.

The first radius of curvature 53 is lower than the second radius of curvature 55, in some embodiments by at least 20%, and by at most 60% lower than the second radius of curvature 55. The first section 52 has the strongest local curvature (lowest radius of curvature) between the flat flank 45 and the summit 51 of the cam 42. A length, measured in the unrolling direction, of the cam 42 is 20% to 40% longer because the middle second section 54 is less curved than a cam whose top is designed with a cylindrical top and the second radius of curvature. A ratio of height 50 of the cam 42 and the second radius of curvature 55 is within the range of 0.5 and 0.75. The first radius of curvature 53 is nearly identical to the height 50, their ratio ranging between 0.9 and 1.2, for example. The top 46 has a ratio of more than 50% of the height 50 of the cam 42. A point of transition 57 from the first area 52 to the second area 54 is located at about 90% to 95% of the height 50 of the cam 42. If the user sets the slide 11 to a minimum torque, the second clutch disk only engages with the first clutch disk to the point of transition 57, while the first section 54 remains untouched.

Figure 5:
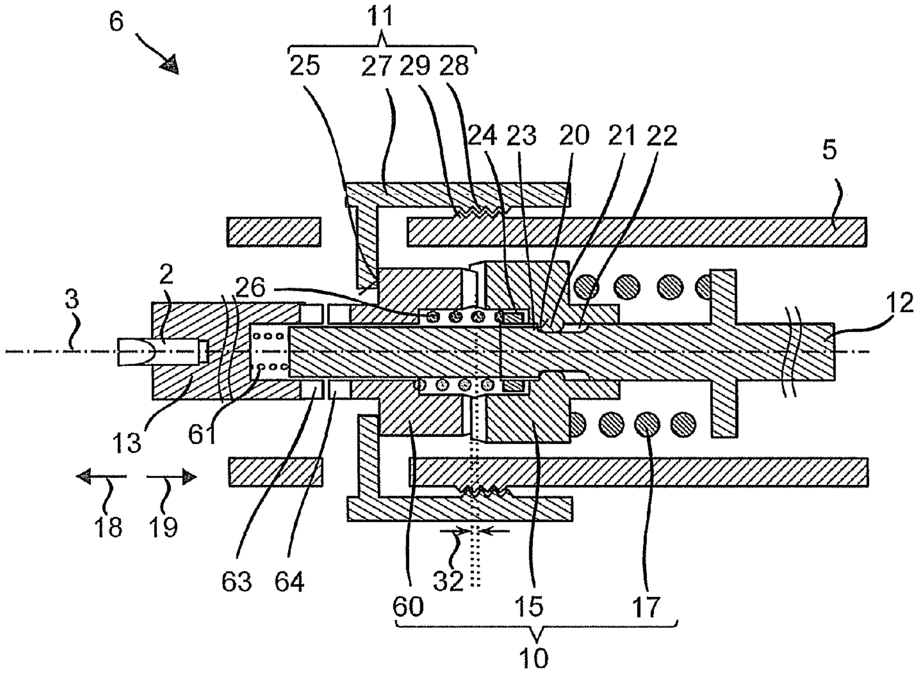
FIG. 5 shows a drivetrain of an electric screw driver.

FIG. 5 shows an additional embodiment of the drivetrain 6. The clutch disk 15 on the drive side is designed essentially identical to the previous embodiment and arranged axially movable and interlocking in the direction of rotation on the countershaft 12. A clutch disk 60 on the drive side is arranged axially movable on the countershaft 12 and can rotate freely relative to the countershaft 12. The clutch disk 15 on the drive side and the clutch disk 60 on the output side are engaged by means of cams 42, as described above. The axial distance between the clutch disk 15 on the drive side and the clutch disk 60 on the output side in the basic position is defined for the clutch disk 60 on the drive side by the stop 25 positioned by the slide 11.

The spindle 13 is axially moveable relative to the countershaft 12. A spring 62 between the spindle 13 and the countershaft 12 keeps them at a distance in the basic position. The spindle 13 includes axially protruding claws 63 in the direction toward the countershaft 12. The claws are able to engage with corresponding claws 64 on the clutch disk 60 on the output side. The claw clutch formed with the claws 63, 64 can be part of a mechanical activation of the spindle 13. In some embodiments, the engagement only takes place when a user pushes the spindle 13 against the countershaft 12.

Figure 6:
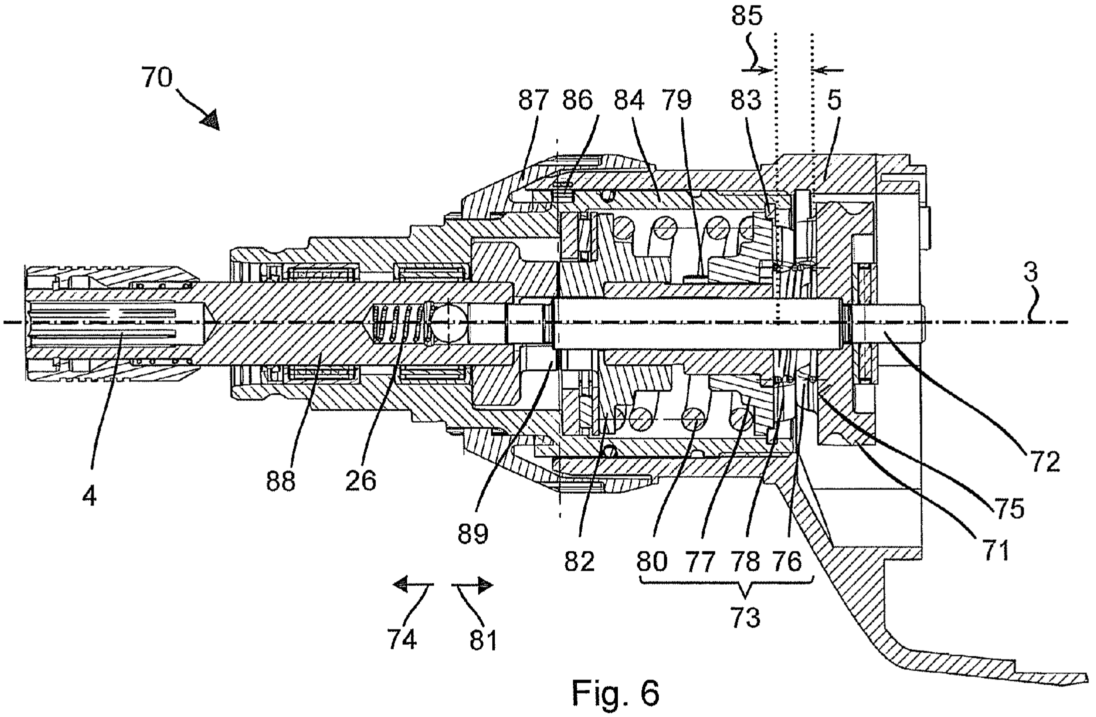
FIG. 6 shows a drivetrain of an electric screw driver.

FIG. 6 shows an additional embodiment of a drivetrain 70. The drivetrain 70 has a motor-activated pinion 71 and a countershaft 72 which are coupled by way of a torque-controlled clutch 73. The pinion 71 is arranged pivotally on the countershaft 72. A drive pinion (not illustrated) combs with the pinion 71. The pinion 71 includes cams 76 on its frontal side 75 pointing in the direction 74 toward the tool retainer 4 and designed as clutch disk on the drive side. The pinion 71 is stationary inside the case 5 alongside the working axis 3. A clutch disk 77 on the output side engaging with the clutch disk on the drive side is axially movably arranged on the countershaft 72. Cams 76 of the clutch disk 71 on the drive side and cams 78 of the clutch disk 77 on the output side can be designed identical to the cams of the embodiments described above. The clutch disk 77 on the drive side is torsionally rigidly coupled with the countershaft 72 via internal interlocking 79.

A pull-back spring 80 pushes the movable clutch disk 77 on the drive side toward the clutch disk 71 on the output side in the readjustment direction 81, in order to keep it engaged in a basic position. The pull-back spring 80 is braced on a ring 82 against the readjustment direction 81. The ring 82 is mounted on the countershaft 72 axially stationary. In some embodiments, the ring 82 turns together with the countershaft 72, in order to prevent a torsion of the pull-back spring 80. In the basic position, the clutch disk 77 on the drive side rests on a stop 83 in the readjustment direction 81. The stop is axially connected rigidly with a runner 84 surrounding the clutch disk 77 on the output side. The stop 83 is realized, for example, with a spring ring, which overlaps with the clutch disk 77 on the output side in radial direction. A distance 85 of the stop 83 from the clutch disk 71 on the drive side defines how far the cams 76, 78 are allowed to engage maximally with each other, for example, in the basic position. The runner 84 and hence the stop 83 can be displaced at different settings alongside the working axis 3 relative to the countershaft 72 and the clutch disk 71 on the drive side. A helicoidally connecting link 86 on a set collar 87, which the user can grasp, engages with the runner 84 and defines its axial position relative to the case 5.

An output shaft 88 is axially moveable relative to the countershaft 72 and engages with the countershaft 72 via a claw clutch 89. The ring 82 mounted on the countershaft is designed as a part of the claw clutch 89. Alternatively, the driveshaft 87 can be connected rigidly with the countershaft 72.

The invention claimed is:

1. In a hand machine tool that includes a tool retainer that retains a tool, a motor that drives the tool retainer in a rotary motion, and a torque-controlled clutch that is connected in a drivetrain between the motor and the tool retainer, the torque-controlled clutch comprising:

a first clutch disk comprising a plurality of first cams that project from a frontal area of the first clutch disk;

a second clutch disk comprising a plurality of second cams that project from a frontal area of the second clutch disk and engage the plurality of first cams of the first clutch disk;

a spring configured to apply a force to the second clutch disk in a readjustment direction relative to the first clutch disk, wherein the second clutch disk is displaceably arranged alongside an axis parallel to the readjustment direction and toward the readjustment direction limited by a stop; and a controlling unit that stipulates an axial distance between the first clutch disk and the stop to define an engagement depth of the plurality of first cams of the first clutch disk with respect to the plurality of second cams of the second clutch disk, wherein each of the plurality of first cams or each of the plurality of second cams include a convexly curved top, wherein each convexly curved top includes a radius of curvature that is increasing toward a summit, wherein the top includes a first section and a second section, wherein the first section extends on a rising side to the summit, wherein the first section includes a first radius of curvature, wherein the second section includes a second radius of curvature, and wherein the first radius of curvature is lower than the second radius of curvature.

2. The torque-controlled clutch according to claim 1, wherein the first clutch disk and the second clutch disk are movably arranged alongside the axis relative to a first shaft.

3. The torque-controlled clutch according to claim 2, wherein the first clutch disk rests on a second stop that is displaceable alongside the axis and that is formed by the controlling unit in a direction facing away from the second clutch disk.

4. The torque-controlled clutch according to claim 3, wherein the second clutch disk is interlocked with the first shaft that transmits a torque, wherein the first clutch disk is interlocked with a second shaft that transmits the torque, and wherein the first clutch disk is moveable relative to the second shaft.

5. The torque-controlled clutch according to claim 4, wherein the first clutch disk is arranged on the first shaft and coupled with the second shaft via a claw clutch.

6. The torque-controlled clutch according to claim 2, wherein the second clutch disk is interlocked with the first shaft that transmits a torque, wherein the first clutch disk is interlocked with a second shaft that transmits the torque, and wherein the first clutch disk is moveable relative to the second shaft.

7. The torque-controlled clutch according to claim 6, wherein the first clutch disk is arranged on the first shaft and coupled with the second shaft via a claw clutch.

8. The torque-controlled clutch according to claim 1, wherein the first radius of curvature is at least 20% smaller than the second radius of curvature.

9. The torque-controlled clutch according to claim 8, wherein that the second radius of curvature is between 0.9 to 1.2 times as much as a height of the cam.

10. The torque-controlled clutch according to claim 9, wherein at one of the first cams includes a flat rising flank to which the first section of the top is connected.

11. The torque-controlled clutch according to claim 1, wherein that the second radius of curvature is between 0.9 to 1.2 times as much as a height of the cam.

12. The torque-controlled clutch according to claim 1, wherein at one of the first cams includes a flat rising flank to which the first section of the top is connected.

13. The torque-controlled clutch according to claim 1, wherein the controlling unit includes a slide that moves relative to a housing of the hand machine tool, and wherein an inside surface of the slide provides a second stop.

14. The torque-controlled clutch according to claim 1, wherein the tool includes a screw bit.

15. The torque-controlled clutch according to claim 1, wherein the second clutch disk is interlocked with a countershaft that transmits torque from the motor, wherein the first clutch disk is interlocked with an output spindle that transmits the torque.

16. In a hand machine tool that includes a tool retainer that retains a tool, a motor that drives the tool retainer in a rotary motion, and a torque-controlled clutch that is connected in a drivetrain between the motor and the tool retainer, the torque-controlled clutch comprising:

a first clutch disk comprising a plurality of first cams that project from a frontal area of the first clutch disk;

a second clutch disk comprising a plurality of second cams that project from a frontal area of the second clutch disk and engage the plurality of first cams of the first clutch disk;

a spring configured to apply a force to the second clutch disk in a readjustment direction relative to the first clutch disk, wherein the second clutch disk is displaceably arranged alongside an axis parallel to the readjustment direction and toward the readjustment direction limited by a stop; and a controlling unit that stipulates an axial distance between the first clutch disk and the stop to define an engagement depth of the plurality of first cams of the first clutch disk with respect to the plurality of second cams of the second clutch disk, wherein each of the plurality of first cams or each of the plurality of second cams include a convexly curved top, wherein each convexly curved top includes a radius of curvature that is increasing toward a summit, wherein the second clutch disk is interlocked with a countershaft that transmits torque from the motor, wherein the first clutch disk is interlocked with an output spindle that transmits the torque, wherein the countershaft has a longitudinal groove in which resides a protruding peg of the second clutch disk, and wherein the protruding peg can move at least axially in the longitudinal groove.

17. The torque-controlled clutch according to claim 16, wherein the second clutch disk can be limited in an axial direction due to limited movement of the protruding peg in the longitudinal groove.

18. In a hand machine tool that includes a tool retainer that retains a tool, a motor that drives the tool retainer in a rotary motion, and a torque-controlled clutch that is connected in a drivetrain between the motor and the tool retainer, the torque-controlled clutch comprising:

a first clutch disk comprising a plurality of first cams that project from a frontal area of the first clutch disk;

a second clutch disk comprising a plurality of second cams that project from a frontal area of the second clutch disk and engage the plurality of first cams of the first clutch disk;

a spring configured to apply a force to the second clutch disk in a readjustment direction relative to the first clutch disk, wherein the second clutch disk is displaceably arranged alongside an axis parallel to the readjustment direction and toward the readjustment direction limited by a stop; and a controlling unit that stipulates an axial distance between the first clutch disk and the stop to define an engagement depth of the plurality of first cams of the first clutch disk with respect to the plurality of second cams of the second clutch disk, wherein each of the plurality of first cams or each of the plurality of second cams include a convexly curved top, wherein each convexly curved top includes a radius of curvature that is increasing toward a summit, wherein the second clutch disk is interlocked with a countershaft that transmits torque from the motor, wherein the first clutch disk is interlocked with an output spindle that transmits the torque, wherein the output spindle has a longitudinal groove in which resides a protruding peg of the first clutch disk, wherein the protruding peg can move at least axially in the longitudinal groove, and wherein the first clutch disk can be limited in an axial direction due to limited movement of the protruding peg in the longitudinal groove.

* * * * *